H. VAN FLEET.
APPARATUS FOR THE SEPARATION OF GASEOUS MIXTURES.
APPLICATION FILED APR. 18, 1914.
1,204,521.
Patented Nov. 14, 1916.
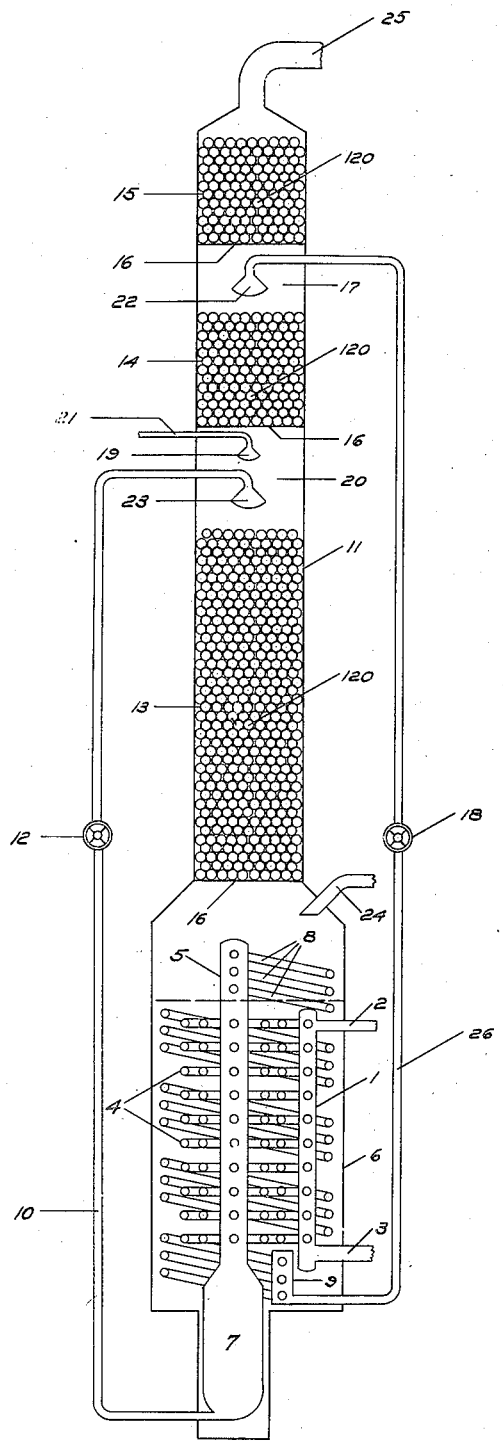
WITNESSES
INVENTOR
BY Herman Van Fleet
Cyrus N. Anderson
ATTORNEY

UNITED STATES PATENT OFFICE.

HERMAN VAN FLEET, OF ARDMORE, PENNSYLVANIA, ASSIGNOR TO AMERICAN AIR-LIQUEFYING COMPANY, OF NEW YORK, N. Y., A CORPORATION OF NEW YORK.

APPARATUS FOR THE SEPARATION OF GASEOUS MIXTURES.

1,204,521.   Specification of Letters Patent.   Patented Nov. 14, 1916.

Application filed April 18, 1914. Serial No. 832,776.

*To all whom it may concern:*

Be it known that I, HERMAN VAN FLEET, a citizen of the United States, and a resident of Ardmore, Montgomery county, State of Pennsylvania, have invented certain new and useful Improvements in Apparatus for the Separation of Gaseous Mixtures, of which the following is a specification.

My invention relates broadly to apparatus for the separation of gaseous mixtures of any variety and proportion into their component gases. I shall describe the same, however, more particularly as it relates to the separation of atmospheric air into its constituent gases, such separation being effected to any desired degree of purity by means of concomitant liquefaction and evaporation.

One of the objects of my invention is to provide an improvement in apparatus for the separation of a mixture of gases into its constituent gases which will effect such separation both efficiently and economically and in the accomplishment of this purpose I provide an apparatus which permits the process of separation to be carried on in a different manner than has heretofore, as far as I am aware, been practised.

Other objects and advantages of my invention will be set forth hereinafter in connection with the detailed description of my invention or will be apparent therefrom.

In order that my invention may be more readily comprehended and understood reference should be had to the accompanying drawing illustrative of one form of a convenient embodiment of my invention but it will be understood that the same is susceptible of embodiment in other forms without departing from the scope thereof.

The accompanying drawing represents a longitudinal sectional view of an apparatus embodying my invention, certain pipes, however, being shown in elevation.

The air to be separated into its elements is compressed to the desired pressure and after having been treated in any satisfactory manner to remove moisture and carbon dioxid, and after having been cooled by the use of counter current heat interchange apparatus, of any known desired construction, it enters a header 1 through the pipes 2 and 3 which in the form of construction illustrated are connected to the header adjacent to its opposite ends. From the header 1 the cooled and compressed air is distributed to the series of horizontally arranged coiled pipes 4. These coils spring from the header 1 and terminate in the header 5. The number of coiled pipes in the series may be increased or diminished, as desired. These horizontal coiled pipes are wholly or partially submerged in liquid oxygen or liquid rich in oxygen which is contained in the casing 6 which constitutes a receptacle therefor, and which is under a less pressure than the pressure in the coils 4. During the passage of the air through the submerged horizontal coils 4 it is partially liquefied. The amount which is liquefied depends on the pressure of the air, the velocity of the air moving in the coils 4, the length of said coils, etc. The fraction or portion which is liquefied is collected in the header 5 which has joined to its lower extremity a liquid receiver 7.

Prominent scientific authorities disagree as to the theory of fractional or preferential condensation of the air. The drops of liquid which are formed in the horizontal coils 4 upon first condensing may be composed of a liquid rich in oxygen or may be liquid air. In either case, the drops formed are directly in the path of the incoming stream of air which is moving forward to occupy the space of the air previously liquefied in such coils. This, forwardly moving gaseous air impinges on the drops previously formed, enveloping and physically contacting with them, impelling them onward through the length of the coils 4 toward the header 5 by virtue of the force due to the velocity of the incoming gaseous air.

The gaseous air and the liquid drops move onward simultaneously through the horizontal coils 4, the gaseous air enveloping and impinging upon the said liquid drops or liquid portions so that there is a continuous progressive washing, so to speak, of the liquid with the result that the non-condensed gas is progressively impoverished in oxygen and the liquefied gas progressively enriched in oxygen, giving off a portion of its nitrogen in exchange for such oxygen. As a result of such simultaneous onward or forward movement of the gaseous air and liquid in the same direction, in the manner stated, there is, as already indicated, a continuous action and reaction or concomitant action between the two so that the process of liquefaction and separation of the constituents of the air becomes a very efficient one.

The drops of liquid condensed in the horizontal coils 4 may be so washed and progressively enriched in oxygen that the oxygen contained in the resulting product approaches a maximum of 50%.

The residual gas passes from the header 5 into the helical coils 8 which are joined to the header at points near the top thereof. Three of these coils are shown but it will be understood that the number may be changed as desired within practical limits. The gas which enters the coils 8 is the more volatile of the constituents of the gaseous mixture being separated into its constituent parts and in case of air consists of almost pure nitrogen gas, the purity depending on the dimensions of the horizontal coils 4 and the velocity with which the air travels through said coils. The residual nitrogen gas travels onward through the helical coils 8 which are submerged wholly or partially in liquid oxygen or liquid rich in oxygen in the receptacle 6 (which is under less pressure than the gas in said coils) and is liquefied in whole or in part in such coils 8 and is collected in the receiver or header 9. These coils 8 are coiled around the headers 1 and 5 and the horizontal coils 4.

The liquid which is rich in oxygen and which is collected in the receiver 7 is, by reason of the pressure to which it is subjected, discharged by a pipe 10 near the central or middle portion of the rectifier column 11 at which point in the column the ascending evaporated gases contain approximately 21% of oxygen. The flow of liquid from the receiver 7 through the pipe 10 is regulated by a valve 12.

The column 11 is filled with any satisfactory material presenting a large surface of contact between the descending liquid and the rising gas. I prefer to employ for this purpose small round hollow aluminum balls 120 because aluminum has a very low specific heat and because of their being round I secure a maximum amount of surface upon which the liquid and the gases are distributed. By the use of hollow balls the amount of metal from which the heat must be extracted is greatly decreased. These balls are divided into three separate groups, 13, 14 and 15, each of which groups is supported upon a perforated plate 16 which are supported upon the interior of the rectifier column 11.

The liquid rich in nitrogen which is collected in the receiver 9 is by reason of the pressure upon the same discharged by a pipe 26 near the top of the rectifier column 11 in the space 17 between the groups 14 and 15 of balls. The flow of liquid or liquid and gas through the pipe 26 from the receiver 9 is regulated by a valve 18.

On account of the leakage or passage of heat into the apparatus due to the impossibility of securing perfect insulation and on account of other unavoidable imperfections in the construction, the level of the liquid oxygen which surrounds the coils 4 and 8 in the receptacle 6 will gradually fall or descend unless adequate means is employed to make up for such losses. To maintain the liquid in the receptacle 6 at a height which should be as nearly constant as practicable the rectifier is supplied with liquid air from an independent source through a nozzle or spray 19 in the space 20 in the rectifying column. The flow of liquid oxygen through the pipe 21 into the rectifying column is regulated and controlled by a valve which is not shown.

The liquid, which is rich in nitrogen and which is discharged from the nozzle 22, that which is rich in oxygen and which is discharged from the nozzle 23, and the liquid air which is discharged from the nozzle 19, percolates slowly downward in the rectifying column 11, trickles over the aluminum balls 120 and is at all times in contact with the ascending vapors which result from the vaporization of the liquid oxygen contained in the receptacle 6. The gases rich in oxygen which arise from the oxygen liquid in the receptacle 6 and which pass upward in the distilling column become richer in nitrogen as they travel upward and continue to be washed by the percolating liquid trickling downward over the aluminum balls 120 in the groups 13 and 14. The percolating liquid which is trickling downward over the balls is becoming on the contrary richer and richer in oxygen until finally when it reaches the receptacle 6 it has attained a purity of from 97 to 100% of oxygen.

In order to recover the oxygen of the gases which reach and pass beyond the space 20, a liquid consisting of nitrogen or which is rich in nitrogen is sprayed into the column through the spray nozzle 22 as described. This liquid being colder than the rising gases and coming into physical and intimate contact therewith frees them of most or substantially all of the oxygen gas which they may contain, liquefying such oxygen gas so that it turns and flows back into the column, percolating downward through the aluminum balls 120 as described, thus preventing escape of but a very small percentage of oxygen.

The residual nitrogen gas is discharged from the rectifying column through a discharge pipe 25.

In order to increase the efficiency of the apparatus and of the process practised thereby it is necessary to provide means beyond the point at which the nitrogen liquid or liquid rich in nitrogen is discharged into the column from the spray or nozzle 22 to deter or retard the flow of gases. Unless some such means were provided the nitrogen gas formed upon discharge from such nozzle 22 as a result of its release from pressure would pass quickly from the column out through the discharge pipe 25. To prevent the ready egress of the gas and for the purpose of retarding and deterring such egressive movement I have prolonged the column 11 beyond the space 17 in which the nozzle 22 discharges and have filled the same with aluminum balls 120 which constitute the group 15 hereinbefore referred to. These balls sufficiently retard and deter the ouward movement of the nitrogen gas or gas rich in nitrogen to cause the same to impinge upon and contact with any oxygen gas which may have reached a point in the column above the space 17. Such nitrogen gas or gas rich in nitrogen being of a temperature sufficiently low to cause the liquefaction of the oxygen the latter is liquefied and as a result trickles downwardly through the aluminum balls of the group 15 and across the space 17 and on downward until it finally reaches the receptacle 6.

As all of the oxygen gas evaporated from the liquid oxygen in the receptacle 6 is not required for rectification in the rectifying column 11 a portion thereof is drawn off through the pipe 24 which communicates with the upper portion of the receptacle 6. The gas or vapor so drawn off is collected and stored in any suitable container which, however, is not shown.

It will be seen that I have embodied my invention in a unitary structure or apparatus the various parts of which coöperate to effect the desired result in a most efficient and economic manner.

The process described herein but which is not claimed is believed to be new and novel and is reserved to form the subject matter of an application for Letters Patent to be subsequently filed.

I claim:—

1. In an apparatus for the separation of gases, the combination of a receptacle, a header therein for the reception of a gaseous mixture, a second header therein, horizontally arranged pipes connected with the said headers, and means for separating the gases of said mixture, the said headers and pipes being adapted to be submerged wholly or partially in a liquid formed by the liquefaction of one of the constituents of the mixture.

2. The combination of a receptacle, a header therein for the reception of a gaseous mixture, a second header in said receptacle in operative relation to the said first-named header, horizontally arranged coiled pipes springing from the first-named header and terminating in the second-named header, the second-named header having connection with a receiver for reception of liquefied gas from such second header, the said headers, coiled pipes and receiver being adapted to be submerged wholly or partially in a liquefied gas.

3. The combination of a header for the reception of a gaseous mixture to be separated into its constituent parts, a second header in operative relation to the first-named header, horizontally arranged coiled pipes having connection at their opposite ends with said headers, the second header communicating with a receptacle which receives liquefied gas from such second header, a third header, and helical coils leading from the upper portion of the said second header and terminating in the third header, the several beforementioned parts being adapted to be wholly or partially submerged in a liquefied gas.

4. The combination of a header, connections for supplying a gaseous mixture to said header, one of the said connections being joined to such header near one end and the other of such connections being joined thereto near its other end, a second header, a series of parallel and horizontally arranged coiled pipes connecting the said headers whereby the gas is distributed from the first-named header to the second-named header, such gas being either wholly or partially liquefied in such horizontal pipes, a receptacle having connection with the second-named header for the reception of the liquefied gas, a third header, helical coils having connection with the top portion of the second-named header and extending downwardly and coiling around the two first-named headers and the said horizontally arranged coiled pipes and terminating in the third header, and separate means for conveying the liquids from the said receptacle and from the said third header.

5. The combination of a header, connections for suppling a gaseous mixture to said header, one of the said connections being joined to such header near one end and the other of such connections being joined thereto near its other end, a second header, a series of parallel and horizontally arranged coiled pipes connecting the said headers whereby the gas is distributed from the first-named header to the second-named header, such gas being either wholly or partially liquefied in such horizontal pipes, a receptacle having connection with the second-named header for the reception of the liquefied gas, a third header, helical coils having connection with the top portion of the second-named header and terminating in the third header, and separate means for conveying the liquids from the said receptacle and from the said third header.

6. The combination of a liquefied gas receptacle, a rectifying column communicating therewith, means for separately collecting the partially separated liquefied constituents of a gaseous mixture, means for conveying the less volatile of said liquefied gases to the said rectifying column and discharging the same thereinto, means for conveying the more volatile of the said liquefied gases to the said column and discharging the same thereinto at a point above the point of discharge of the less volatile liquefied gas, and means in said column above the point of discharge of the more volatile liquefied gas for retarding the upward egressive flow of the gas resulting from the discharge of the said more volatile liquefied gas.

7. In an apparatus for the separation of the gases of a gaseous mixture, the combination of a rectifying column, a liquefied gas receptacle for receiving and holding the less volatile liquefied constituent of the mixture, means adapted to be wholly or partially submerged in the liquid in such receptacle for liquefying the constituents of such mixture, means for receiving the liquefied constituents, means for conveying the less volatile of such liquids to an intermediate portion of the said rectifying column, means for conveying the more volatile of said liquids to the said rectifying column and discharging the same at a point above the point of discharge thereinto of the less volatile liquid, a discharge passage way leading from said rectifying column to remove therefrom the more volatile constituents of the gaseous mixture, and means situated in the said column above the point of discharge thereinto of the more volatile liquid for the purpose of retarding the egress of the gases.

8. In an apparatus for the separation of gases of a gaseous mixture, the combination of a receptacle for receiving and containing the liquefied less volatile constituent of such mixture, horizontally arranged pipes situated in said receptacle and adapted to be wholly or partially submerged in such liquid in which the said gaseous mixture is partially liquefied, a receiver into which the liquefied and unliquefied portions are discharged from said pipes, means situated in said receptacle for conveying the unliquefied portion of gas from said receiver and for liquefying the same, a receiver also situated in said receptacle for receiving said last-named portion, a rectifying column, and separate means for conveying the said liquefied portions into the said column and discharging the same therein at different points.

9. In an apparatus of the character described, a rectifying column, means for discharging liquefied gases thereinto, means contained in said column for distributing the said liquids over large areas of surface, the said last-mentioned means being divided into separate and independent groups, one of the said groups being situated in the said column above the highest point at which a liquid is discharged into said column.

10. In an apparatus of the character described, the combination of a liquid oxygen receptacle, a header in said receptacle for the reception of a gaseous mixture under compression, a second header in said receptacle, horizontal coiled pipes connecting said headers in which pipes the gaseous mixture is partially liquefied, the said pipes delivering the liquefied and unliquefied portions of the gases to the second header, helical coils situated in said receptacle and having connection with the second header for conveying therefrom the unliquefied nitrogen gas or gas rich in nitrogen from said header, the said gas being liquefied in said coils, and the said header and coils being adapted to be in whole or in part submerged in the liquid oxygen in said receptacle, a receiver for receiving the liquefied gas from said helical coils, a rectifying column, means for conveying the liquefied separated portions of said mixture into said column and discharging the same therein, and means having connection with said receptacle at a point below the point of connection of the rectifying column therewith for conveying oxygen vapors therefrom.

11. In an apparatus for the separation of the gaseous constituents of the air, the combination of a header for the reception of the air under pressure, a second header, horizontal coiled tubes having connection with said headers in which the air is partially liquefied, helically coiled tubes having connection with the second header for conveying the nitrogen gas or gas rich in nitrogen therefrom and in which the said gas is liquefied, a receptacle in which said headers and coils are situated, the said receptacle containing oxygen liquid in which said headers and coils are adapted to be submerged wholly or in part, and means for conveying the liquefied gas from said helical tubes.

12. In an apparatus of the character described, the combination of a receptacle, a plurality of series of coiled pipes therein, each of the coiled pipes of one of the said series being horizontally arranged, and means whereby the gases in such coils may be liquefied.

13. In an apparatus of the character described, the combination of a receptacle, a plurality of series of coiled pipes therein, each of the coiled pipes of one of the said series being horizontally arranged, and each of the coiled pipes of the other series being arranged at angles to a horizontal plane, and means whereby the gases in such coils may be liquefied.

14. In an apparatus of the character described, the combination of a receptacle and a plurality of series of coiled pipes therein each of the coiled pipes of one of the said series being horizontally arranged and the other coiled pipes of the other series being inclined with respect to and surrounding the horizontally arranged pipes, and means whereby the gases in such coils may be liquefied.

15. In an apparatus for the separation of gases, the combination of a receptacle, a header therein for the reception of a gaseous mixture, a second header therein, a plurality of pipes having connection at their opposite ends with the said headers, said pipes respectively being arranged in flat coils and being situated in substantially horizontal parallel planes, a third header situated in said receptacle at a point adjacent to the bottom thereof, a plurality of helically coiled pipes extending from the upper portion of the second named to the third named header, and means for conveying the liquefied gases from the said second and third named headers.

16. In an apparatus for the separation of gases, the combination of a receptacle, a header therein for the reception of a gaseous mixture, a second header therein, a plurality of pipes having connection at their opposite ends with the said headers, said pipes respectively being arranged in flat coils and being situated in substantially horizontal parallel planes, a third header situated in said receptacle at a point adjacent to the bottom thereof, a plurality of helically coiled pipes extending from the upper portion of the second named to the third named header, means for conveying the liquefied gases from the second and third named headers, and means for separating the gases of said mixture, all of the said headers and coiled pipes being adapted to be submerged wholly or partially in a liquid in said receptacle formed by the liquefaction of one of the constituents of the mixture.

In testimony that I claim the foregoing as my invention, I have hereunto signed my name this 16th day of April, A. D. 1914.

HERMAN VAN FLEET.

In the presence of—
C. E. KLEINFELDER,
E. W. SMITH.